United States Patent
Buchanan (10) Patent No.: US 12,534,147 B2
(45) Date of Patent: Jan. 27, 2026

(54) VEHICLE ACCESSORY MOUNTING SYSTEM

(71) Applicant: Chad M. Buchanan, Mequon, WI (US)

(72) Inventor: Chad M. Buchanan, Mequon, WI (US)

( * ) Notice: Subject to any disclaimer, the term of this patent is extended or adjusted under 35 U.S.C. 154(b) by 220 days.

(21) Appl. No.: 18/211,342

(22) Filed: Jun. 19, 2023

(65) Prior Publication Data

US 2024/0417016 A1   Dec. 19, 2024

(51) Int. Cl.
  *B62J 11/00*   (2020.01)
  *B62J 7/08*   (2006.01)
  *B62J 9/24*   (2020.01)

(52) U.S. Cl.
  CPC .......... *B62J 11/00* (2013.01); *B62J 7/08* (2013.01); *B62J 9/24* (2020.02)

(58) Field of Classification Search
  CPC ......... B62J 7/08; B62J 7/04; B62J 9/24; B62J 9/23; B62J 9/27
  See application file for complete search history.

(56) References Cited

U.S. PATENT DOCUMENTS

| | | | |
|---|---|---|---|
| 4,730,758 A | 3/1988 | McMurtrey | |
| D496,321 S | 9/2004 | McMurtrey et al. | |
| 8,998,046 B2 * | 4/2015 | Moeller | B60R 9/058 224/309 |
| 11,608,134 B2 * | 3/2023 | Ortlieb | B62J 7/04 |
| 11,702,165 B2 * | 7/2023 | Ortlieb | B62J 7/04 224/412 |
| 2008/0073396 A1 * | 3/2008 | Chiang | B62J 9/23 280/202 |
| 2016/0001838 A1 | 1/2016 | Van Balveren et al. | |
| 2020/0055559 A1 | 2/2020 | Alagourie | |

OTHER PUBLICATIONS https://bikase.com/products/dairyman-rear-basket?variant=44108984582428&currency=USD&utm_medium=product_sync&utm_source=google&utm_content=sag_organic&utm_campaign=sag_organic&gad=1&gclid=EAlalQobChMlorvSr8zP_wIV3y6zAB0N4QD5EAQYASABEgL6lfD_BwE (accessed Jun. 14, 2023).

* cited by examiner

*Primary Examiner* — Corey N Skurdal
(74) *Attorney, Agent, or Firm* — Rathe Lindenbaum LLP (57) ABSTRACT

A vehicle accessory mounting system may include an accessory base, a first carriage movably coupled to the base, a retainer configured to releasably retain the first carriage at one of a plurality of available positions along the accessory base, a first hook, a second hook and a spring. Carried by the carriage and configured to engage a first portion of a rack and a second hook configured to engage a second portion of the rack. The first hook is movable relative to the carriage between an extended position for engagement of the first hook with a first portion of a rack and a retracted position for release of the first hook from the first portion of the rack, a spring captured between the first hook and the first carriage to resiliently bias the first hook in the extended position, and a second hook coupled to the base and facing the first hook, wherein the second hook is configured to engage a second portion of the bike rack.

20 Claims, 9 Drawing Sheets

VEHICLE ACCESSORY MOUNTING SYSTEM

BACKGROUND

Bicycles and other similar vehicles are sometimes equipped with a front or rear rack for mounting accessories such as baskets and the like.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example vehicle accessory mounting systems that facilitate the mounting of an accessory to a wide range of differently sized racks. The example vehicle accessory mounting engage the rack with hooks. At least one of the hooks is carried by a carriage movably supported by an accessory base for movement to accommodate differently sized racks. At least one of the hooks is further movable relative to the carriage to accommodate an even wider range of differently sized racks. In some implementations, at least one of the hooks is resiliently biased by a spring and is manually movable relative to the carriage while the carriage is releasably locked or retained at a selected position.

In some implementations, the accessory base is integrally formed as a single unitary body as part of an accessory. In some implementations, accessory base 24 is permanently joined to an accessory, such as by rivets, with welding, fusing, adhesives or the like, wherein the accessory base 24 cannot be readily separated from the accessory without damage to either the base or the accessory, or wherein upon being separated, cannot be readily rejoined or reconnected to accessory. In some implementations, the accessory base is removably mountable to a separate independent accessory. For example, in some implementations, the accessory base is screwed to a separate independent accessory base in the form of a basket.

In some implementations, the carriage is releasably locked or retained in place by a retainer. In some implementations, the retainer provides tool less locking and releasing of the carriage to facilitate movement of the carriage along the accessory base. In some implementations, the retainer comprises a manually rotatable knob, the rotation of which results in the carriage being releasably clamped in place at one of a multitude of available positions relative to the accessory base to accommodate differently sized racks. In some implementations, the retainer comprises a series of detents providing different available positions for the carriage, wherein a spring biased pin may be selectively positioned in one of the detents to releasably secure the carriage at a selected position to accommodate a particular sized rack.

In some implementations, the example bike mounting systems comprise a first hook and a second hook that face in opposite directions and that engage opposite sides or oppositely faced portions of the rack. In some implementations, the first hook is carried by and movable relative to a carriage, wherein the carriage is movable relative to the accessory base. In such implementations, the second hook may be integrally formed as a single unitary body with the accessory base, or may be fixedly coupled, directly or indirectly, to the accessory base without the provision of an intermediate carriage that is itself movable relative to the accessory base.

In some other implementations, both the first hook and the second hook are similar to one another and the mirror one another. In such implementations, both the first hook and the second hook are carried by movable relative to first and second carriages which are in turn carried by and movable relative to the accessory base. In such implementations, both the first hook and the second hook may be movable relative to the carriage between an extended position for engagement of the hook with the bike rack and a retracted position for release of the hook from the bike rack. In such implementations, the first hook and the second hook may be associated with first and second respective springs that resiliently bias the first hook and the second hook towards their respective extended rack engaging positions.

For purposes of this disclosure, the term "coupled" shall mean the joining of two members directly or indirectly to one another. Such joining may be stationary in nature or movable in nature. Such joining may be achieved with the two members, or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members. The term "fluidly coupled" shall mean that two or more fluid transmitting volumes are connected directly to one another or are connected to one another by intermediate volumes or spaces such that fluid may flow from one volume into the other volume.

For purposes of this disclosure, the phrase "configured to" denotes an actual state of configuration that fundamentally ties the stated function/use to the physical characteristics of the feature proceeding the phrase "configured to".

For purposes of this disclosure, the term "releasably" or "removably" with respect to an attachment or coupling of two structures means that the two structures may be repeatedly connected and disconnected to and from one another without material damage to either of the two structures or their functioning.

Figure 1:
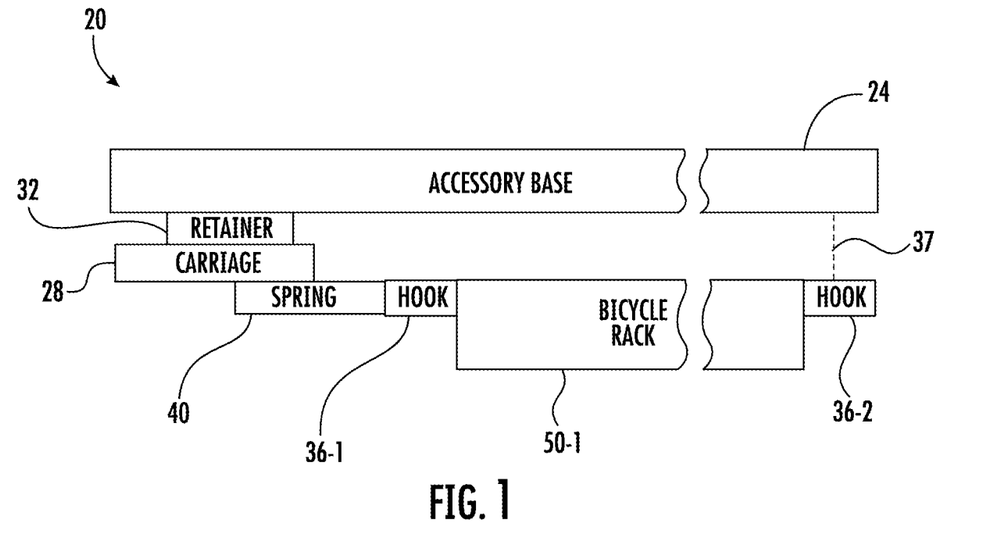
FIG. 1 is a side view schematically illustrating portions of an example vehicle accessory mounting system accommodating a first sized rack.
Figure 2:
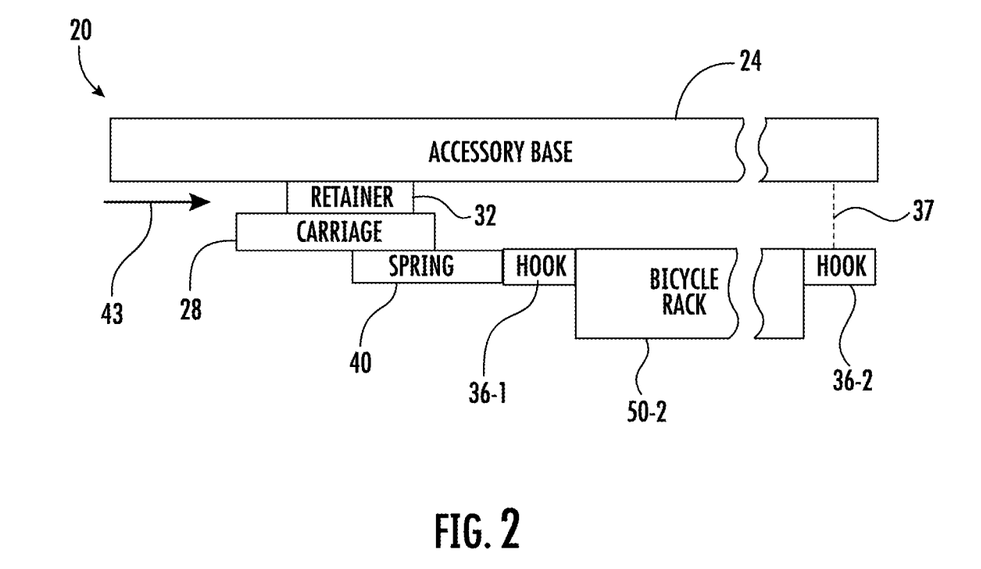
FIG. 2 is a side view schematically illustrating the example vehicle accessory mounting system of FIG. 1 accommodating a second differently sized rack.

FIGS. 1 and 2 schematically illustrate portions of an example vehicle accessory mounting system 20. As shown by FIG. 1, vehicle accessory mounting system 20 comprises accessory base 24, carriage 28, retainer 32, hooks 36-1, 36-2 (collectively referred to as hooks 36) and spring 40. Accessory base comprise a structure configured to support an accessory while also supporting components that releasably mount the accessory base to differently sized racks. In some implementations, accessory base 24 is integrally formed as a single unitary body as part of an accessory. In some implementations, accessory base 24 is permanently joined to an accessory, such as by rivets, with welding, fusing, adhesives or the like, wherein the accessory base 24 cannot be readily separated from the accessory without damage to either the base 24 or the accessory, or wherein upon being separated, cannot be readily rejoinder reconnected to the accessory. In some implementations, the accessory base 24 is removably mountable to a separate independent accessory. For example, in some implementations, the accessory base 24 may be screwed to a separate independent accessory in the form of a basket.

Carriage 28, sometimes referred to as a "guide," is movably coupled to accessory base 24 for movement in a transverse direction along accessory base 24. Carriage 28 carries hook 36-1 and spring 40. Carriage 28 movably supports hooks 36-1 for movement relative to carriage 28.

Retainer 32 comprises a device to releasably secure and retain carriage 28 at a selected one of a plurality of available positions relative to accessory base 24. In some implementations, retainer 32 may comprise a clamp to clamp a portion of carriage 28 against accessory base 24. In some implementations, one or both of the carriage 28 and accessory base 24 may comprise projections and the detents that engage one another to further assist in retaining carriage 28 in a selected position along sensory base 24.

In some implementations, one of accessory base 24 and carriage 28 may comprise a detent while the other of accessory base 24 and carriage 28 comprises a pin or other projection resiliently biased towards a position in which the pin or projection fits within a selected one of a plurality of detents in a row to releasably secure carriage 28 in a selected position along accessory base 24. In such implementations, the projection or pin may be withdrawn from the detent against the bias of a spring to allow the carriage to move relative to the accessory, or in the spring resiliently returns the pin or projection into a new detent at a new selected position to retain the carriage in the new selected position.

Hook 36-1 comprises a member configured to engage or contact a first portion of bicycle rack 50-1. Hook 36-2 comprises a member configured to engage or contact a second portion of bicycle rack 50-1. In the example illustrated, hooks 36 face one another, engaging opposite transverse sides of bicycle rack 50-1. Although system 20 is illustrated as including two oppositely facing hooks 36, in other implementations, system 20 may comprise additional oppositely facing hooks.

Hook 36-1 is carried by carriage 28, with spring 40 captured between hook 36-1 and carriage 28. Hook 36-1 is movable relative to carriage 28 between an extended position for engagement with bicycle rack 50-1 and a retracted position for release of hook 36-1 or separation of hook 36-1 from bicycle rack 50-1. In the retracted position, hook 36-1 is sufficiently spaced from hook 36-2 such that system 20 may be lifted from or otherwise separated from bicycle rack 50-1. In the extended position, hook 36-1 clamps or pinches bicycle rack 50-1 between hooks 36-1 and 36-2.

As schematically indicated by broken line 37, Hook 36-2 is coupled to accessory base 24. Hook 36-2 faces hook 36-1 and is configured to engage a second portion of bicycle rack 50-1. In some implementations, hook 36-2 may be integrally formed as a single unitary body with the accessory base 24. In some implementations, hooks 36-2 may be fixedly coupled, directly or indirectly, to the accessory base 24 without the provision of an intermediate carriage that is itself movable relative to the accessory base. In such implementations, hooks 36-2 may be permanently coupled to accessory base 24 or may be removably coupled to accessory base 24.

In some other implementations, both the first hook 36-1 and the second hook 36-2 are similar to one another and the mirror one another. In such implementations, both the first hook 36-1 and the second hook 36-2 are each carried by and movable relative a carriage similar to carriage 28 that is in turn carried by and movable relative to the accessory base 24. In such implementations, each of the carriages 28 may be releasably secured in place at one of a plurality of available locations relative to accessory base 24 by a respective retainer 32. In such implementations, both of hooks 36 may be movable relative to its respective carriage 28 between an extended position for engagement of the particular hook 36-1, 36-2 with the bicycle rack 50-1 and a retracted position for release of the particular hook 36-1, 36-2 from the bicycle rack 50-1. In such implementations, each of the hooks 36 may be associated with a respective spring, similar to spring 40, that resiliently biases the particular hook 36-1, 36-2 towards their respective extended rack engaging positions.

FIG. 2 illustrates mounting system 20 of FIG. 1 releasably connected to a bicycle rack 50-2 having a smaller transverse width as compared to bicycle rack 50-1. To accommodate the smaller transverse width of bicycle rack 50-2, retainer 32 sufficiently disengaged or released from accessory base 24 to permit carriage 28 to be moved along accessory base 24 in the direction indicated by arrow 43 to the position shown in FIG. 2 in which hook 36-1 is engaging bicycle rack 50-2 in the extended position or a position at which spring 40 is not completely compressed. Once at the selected position, retainer 32 may be actuated to lock and releasably retain carriage 28 in the position shown in FIG. 2.

When accessory base 24 (and possibly an associated accessory) are to be removed from bicycle rack 50-2, hook 36-1 may be moved against the bias spring 40 in a direction opposite to that of arrow 43. This results in hook 36-1 being moved to a retracted position such that hook 36-1 is sufficiently spaced from hook 36-2 such that system 20 may be lifted from bicycle rack 50-2. At a later time when system 20 is to be remounted to the same bicycle rack 50-2, the user manually moves hook 36-1 against the bias of spring 40 to the retracted position, permitting by bicycle rack 50-2 to be more easily positioned between hooks 36-1 and 36-2. Once bicycle rack 50-2 has been positioned between hooks 36-1 and 36-2, the user may release hook 36-1, permitting spring 40 to resiliently urge hook 36-1 in the direction indicated by arrow 43 into engagement with bicycle rack 50-2, pinching or clamping bicycle rack 50-2 between hooks 36. Alternatively, the above operation may be reversed when system 20 is instead to be mounted to bicycle rack 50-1.

Figure 3:
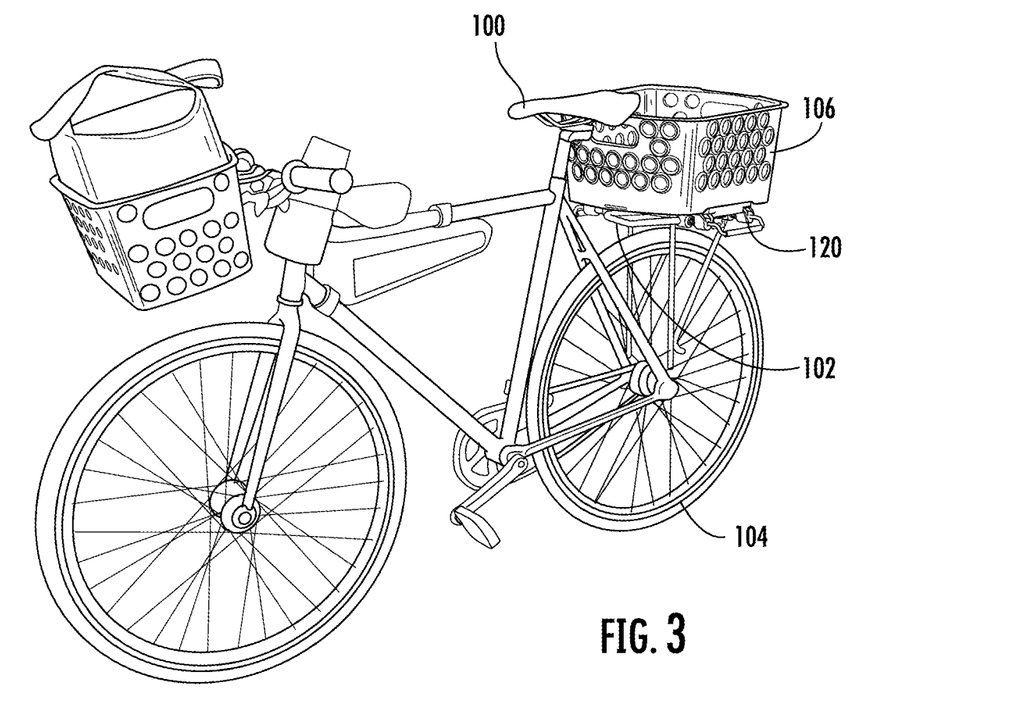
FIG. 3 is a perspective view of an example vehicle, in the form of a bicycle, and an example vehicle mounting system securing an example accessory basket to a rear rack of the bicycle.

FIG. 3 is a perspective view of an example vehicle, in the form of a bicycle 100, having an example rear bicycle rack 102 extending over a rear tire 104 of bicycle 100. FIG. 3 further illustrates an example accessory, in the form of a basket 106, releasably mounted to rack 102 by an example vehicle rack mounting system 120.

Figure 4:
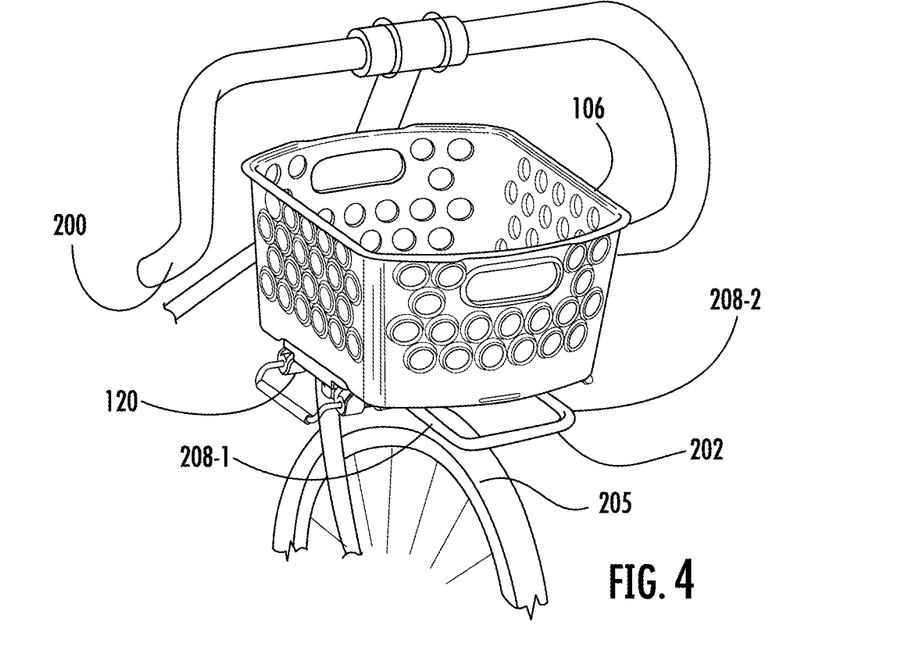
FIG. 4 is a fragmentary perspective view of an example vehicle, in the form of a bicycle, and the example vehicle accessory mounting system of FIG. 3 ready for securing the example accessory basket to a front rack of the bicycle.

FIG. 4 is a perspective view of an example vehicle, in the form of bicycle 200, having an example front bicycle rack 202 extending over a front tire 205 of bicycle 200. FIG. 4 illustrates the same vehicle rack mounting system 120 supporting the same accessory, in the form of basket 106, separated from rack 202, ready for being releasably mounted to rack 202. Rack 202 is similar to rack 102 except that rack 202 extends over the front tire rather than the rear tire 104. As shown by FIG. 4, racks 102 and 202 each comprise a frame structure comprising a pair of transversely spaced side bars 208-1, 208-2 (collectively referred to as side bars 208). Mounting system 120 releasably engages such side bars 208 to releasably secure accessory basket 106 on top of rack 202 in FIG. 4 or rack 102 in FIG. 3.

Figure 5:
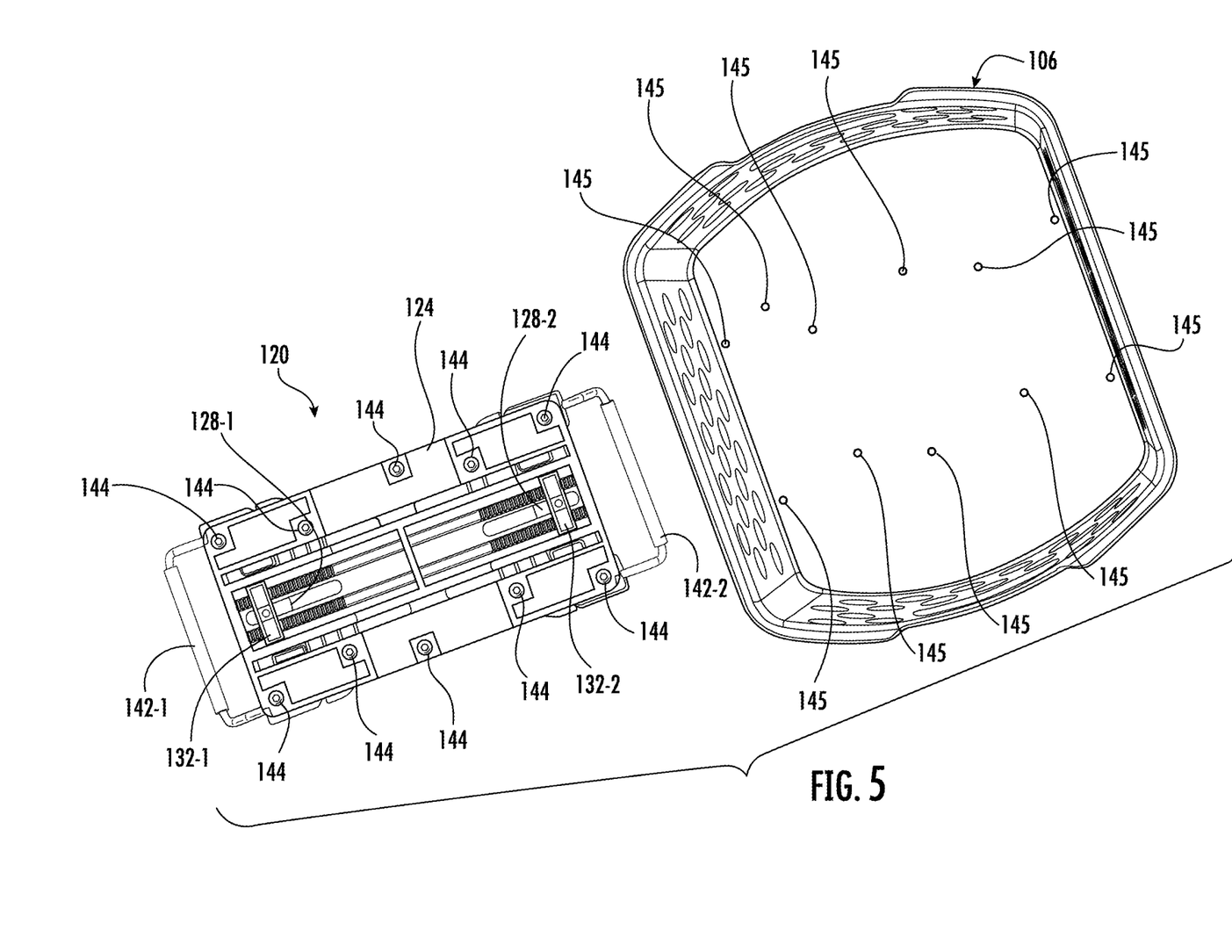
FIG. 5 is a perspective view of the example vehicle accessory mounting system of FIGS. 3 and 4 separated from the example accessory basket.
Figure 6:
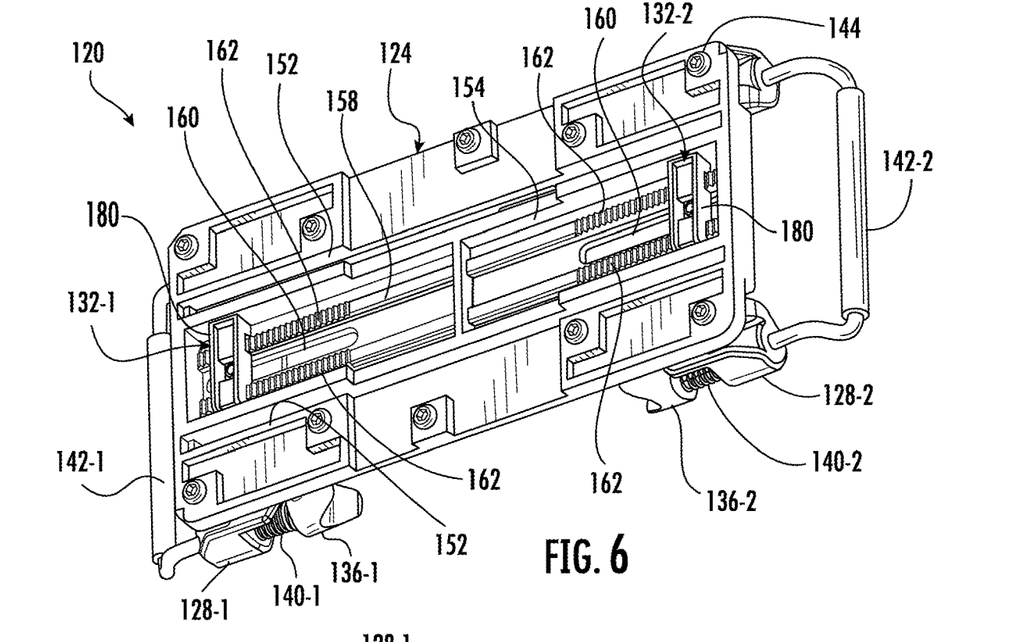
FIG. 6 is a top perspective view of the example vehicle accessory mounting system of FIG. 5.
Figure 7:
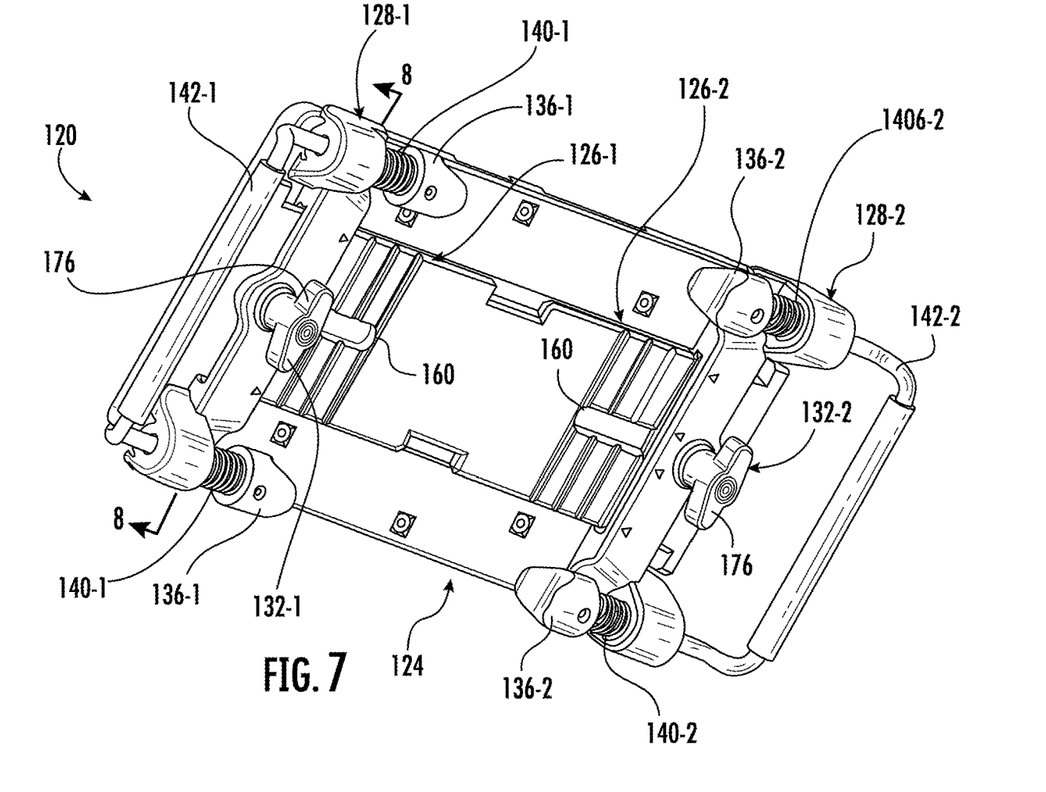
FIG. 7 is a bottom perspective view of the example vehicle accessory mounting system of FIG. 6.

FIG. 5 is a perspective view illustrating vehicle rack mounting system 120 separated from basket 106. FIG. 6 is a top perspective view of vehicle rack mounting system 120. FIG. 7 is a bottom perspective view of the rack mounting system 120. As shown by FIGS. 5-7, vehicle rack mounting system 120 comprises accessory base 124, indicia 126-1, 126-2 (collectively referred to as indicia 126), carriages 128-1, 128-2 (collectively referred to as carriages 128), retainers 132-1, 132-2 (collectively referred to as retainers 132), hooks 136-1, 136-2 (collectively referred to as hooks 136) Springs 140-1, 140-2 (collectively referred to as springs 140) and handles 142-1, 142-2 (collectively referred to as handles 142).

Accessory base 124 comprises a plate, platform, bracket, frame or other structure configured to be removably coupled to an accessory, such as basket 106. As shown by FIG. 5, accessory base 124 is configured to be screwed to a bottom of basket 106. To this end, accessory base 124 comprises mounting screws 144 at locations corresponding to mounting holes 145 in the bottom of basket 106. In other implementations, accessory base 124 may utilize other forms of fasteners or mounting structures for releasably connecting base 124 to basket 106. In yet other implementations, accessory base 124 may be permanently mounted to an accessory, such as basket 106, such that accessory plates 124 may not be readily removed or separated from basket 106 and remounted to basket 106. In such implementations, accessory base 124 may be affixed to basket 106 by rivets, welds, adhesives or the like. In still other implementations, accessory base 124 may be integrally formed as part of a single unitary body as part of a bottom of basket 106.

Figure 8:
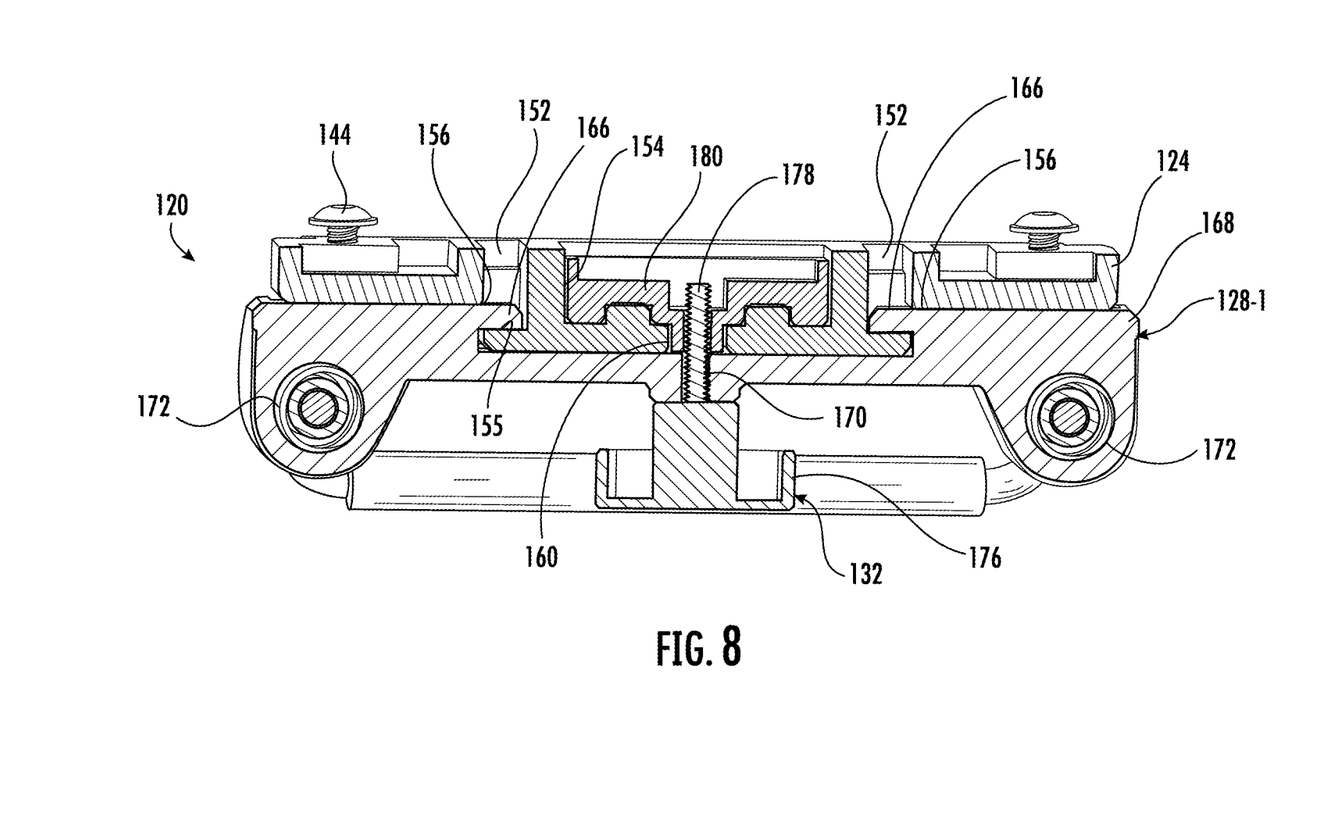
FIG. 8 is a sectional view of the example vehicle accessory mounting system of FIG. 7 taken along line 8-8.

Accessory base 124 is further configured to movably support carriages 128 and to be engaged by retainers 132 for selective securement of carriages 128 in selected positions relative to accessory base 124. As shown by FIGS. 6-8, accessory base 124 comprises outer tracks 152 and middle track 154. Outer tracks 152 comprise grooves longitudinally extending along accessory base 124 on opposite sides of middle track 154. Outer tracks 152 each have a lower floor 155 and an outwardly facing lower slit 156 extending along the length of floor 155. Slits 156 allow portions of each of carriages 128 to project through such slits 156 into sliding engagement with floor 155, slidably supporting carriages 128 for movement along accessory base 124.

Middle track 154 extends into accessory base 124 between outer tracks 152. Middle track 154 comprises a groove having a floor 158 and slots 160 through which portions of retainers 132 extend so as to be movable along floor 158. In the example illustrated, floor 158 comprises a series of teeth 162 (alternating projections and detents) on both sides of each of slots 160. As will be described hereafter, teeth 162 facilitate enhanced retention of retainers 132 and carriages 128 in a selected position or location along accessory base 124.

As shown by FIG. 7, indicia 126 extend along a bottom face of accessory base 124. Indicia 126 comprise markings that identify predetermined locations for carriages 128 for accommodating differently sized racks. Indicia 126 allow a person to quickly and easily slide or move each of carriages 128 to a location well suited for the particular size of the rack of the vehicle or bicycle. In the example illustrated, indicia 126 comprise small grooves formed in the bottom of accessory base 124. In the example illustrated, such grooves may be differently colored for further recognition. In some implementations, indicia 126 may be painted, printed, stamped or adhered (such as a sticker) onto accessory base 124. In some implementations, each of the lines or other markings providing indicia 126 may include text identifying a particular rack type or a selected width associate with the particular liner marking. In some implementations, indicia 126 may be omitted.

Carriages 128, sometimes referred to as guides, are movably coupled to accessory base 124. In the example illustrated, carriages 128 are slidably supported for movement towards and away from one another along carriage base 124. As shown by FIG. 8, carriages 128 each include a pair of inwardly projecting tongues 166 which project through slits 156 and which slidably reside on top of floors 155. Such interactions facilitate sliding movement of carriages 128 along accessory base 124. In other implementations, carriages 128 may be slidably supported or otherwise movably supported along carriage base 124 in other fashions.

As further shown by FIGS. 7 and 8, carriages 128 support and movably carry hooks 136, springs 140 and handles 142 such that hooks 136, springs 140 and handles 142 may move relative to carriages 128 and accessory base 124. As shown by FIGS. 7 and 8, carriages 128 are identical to one another, being supported by accessory base 124 so as to mirror one another. Each of carriages 128 comprises a body 168 defining retainer passage 170 and handle passages 172.

Retainer passage 170 extends up through carriage 128, permitting portions of retainers 132 to be rotatably received within and extend through retainer passages 170 and slots 160. Handle passages 172 extend through the body 168 generally perpendicular to retainer passages 170. Handle passages 170 slidably receive portions of handles 142.

Retainers 132 releasably retain their respective carriages 128 at selected positions relative to accessory base 124. As shown by FIG. 6-8, each of retainers 132 comprises retainer knob 176, threaded shaft 178 and retainer clamp 180. Retainer knob 176 is connected to threaded shaft 178 extends along an underside of carriage 128. Container knob 176 is configured to be manually rotated or turned to rotate shaft 178. Threaded shaft 178 extends from knob 176 through passage 170 and into threaded engagement with retainer clamp 180. Retainer clamp 180 interacts with middle track 154 such that rotation of retainer clamp 180 is prevented. At the same time, inner clamp is shaped in a complementary fashion with respect to middle track 154 so as to be slidable along track 154 when not being clamped, permitting carriage 128 to also slide along track 154 and accessory base 124 when retainer clamp 180 is not being clamped against accessory base 124. Because rotation of retainer clamp 180 is inhibited due to its complementary shape with respect to middle track 154, rotation of knob 176 and threaded shaft 178 either vertically moves retainer clamp 180 away from floor 158 of middle track 154 or towards floor 158 of middle track 154, depending upon the direction of rotation and the helical threads of threaded shaft 178.

Figure 9:
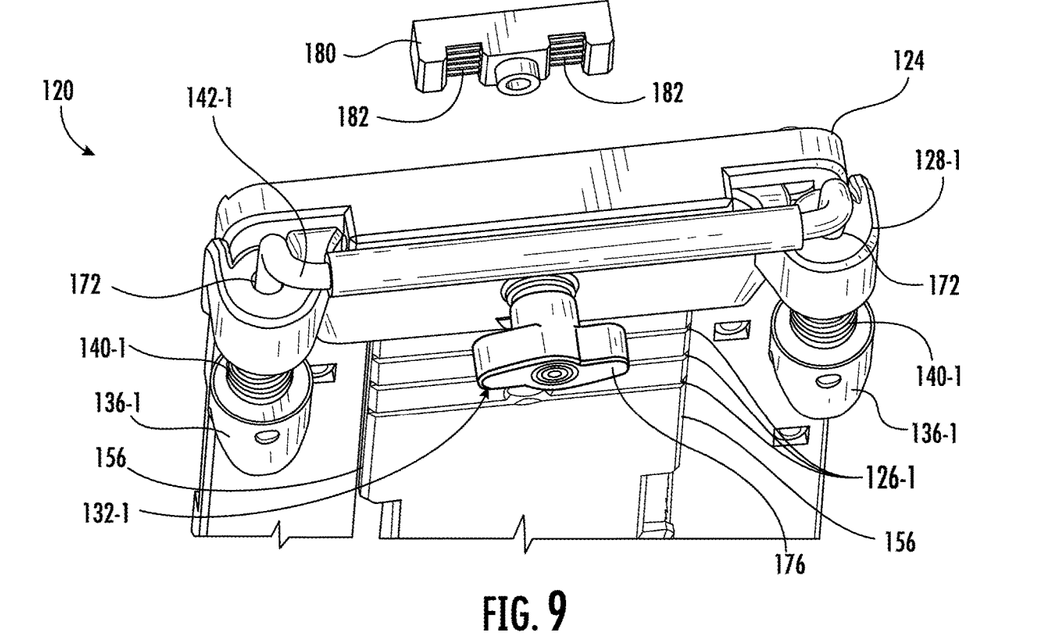
FIG. 9 is an exploded fragmentary perspective view of portions of the example vehicle accessory mounting system of FIG. 7.
Figure 10:
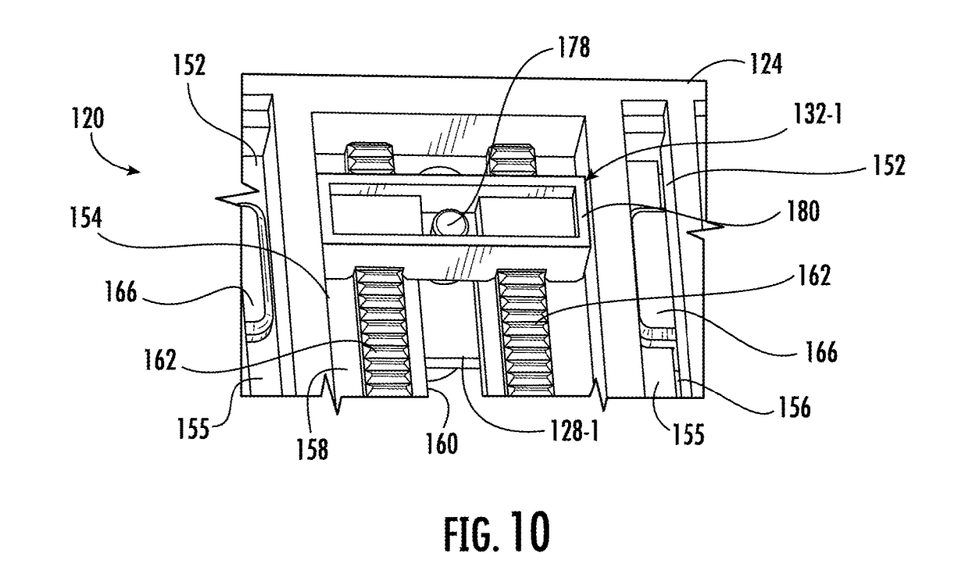
FIG. 10 enlarged fragmentary perspective view illustrating portions of the example vehicle accessory mounting system of FIG. 6.

Sufficient rotation of knob 176 will result in knob 176 pressing or clamping carriage 128 upwards against accessory base 124 and pressing or clamping retainer clamp 180 downwards against accessory base 124. As shown by FIG. 9, in the example illustrated, an underside of retainer clamp 180 further comprises teeth 182 (a series of alternating detents and projections) which extends generally opposite to teeth 162. As shown by FIG. 10, sufficient rotation of knob 176 further draws the pair of opposing teeth 162 and 182 into engagement with one another such that the teeth interlock, further assisting in locking or retaining retainer 132 and the respective carriage 128 relative to accessory base 124. Sufficient reverse rotation of knob 176 lifts or moves retainer clamp 180 such that teeth 182 are withdrawn from teeth 162 permitting retainer 132 and the associated carriage 128 to be slid along middle track 154 to reposition the associated carriage 128. Once carriage 128 has been repositioned at a desired location, knob 176 may be appropriately turned to an extent such that teeth 22 are drawn into teeth 162 to once again lock retainer 132 and the associated carriage 128 in the desired location. In some implementations, one or both of teeth 162, teeth 182 may be omitted. In some implementations, other interlocking structures may be utilized. In yet other implementations, the secure retention of retainer 132 and the associated underlying carriage 128 may be achieved based upon a frictional clamping of two flat surfaces or to roughened or high friction surfaces.

Figure 13:
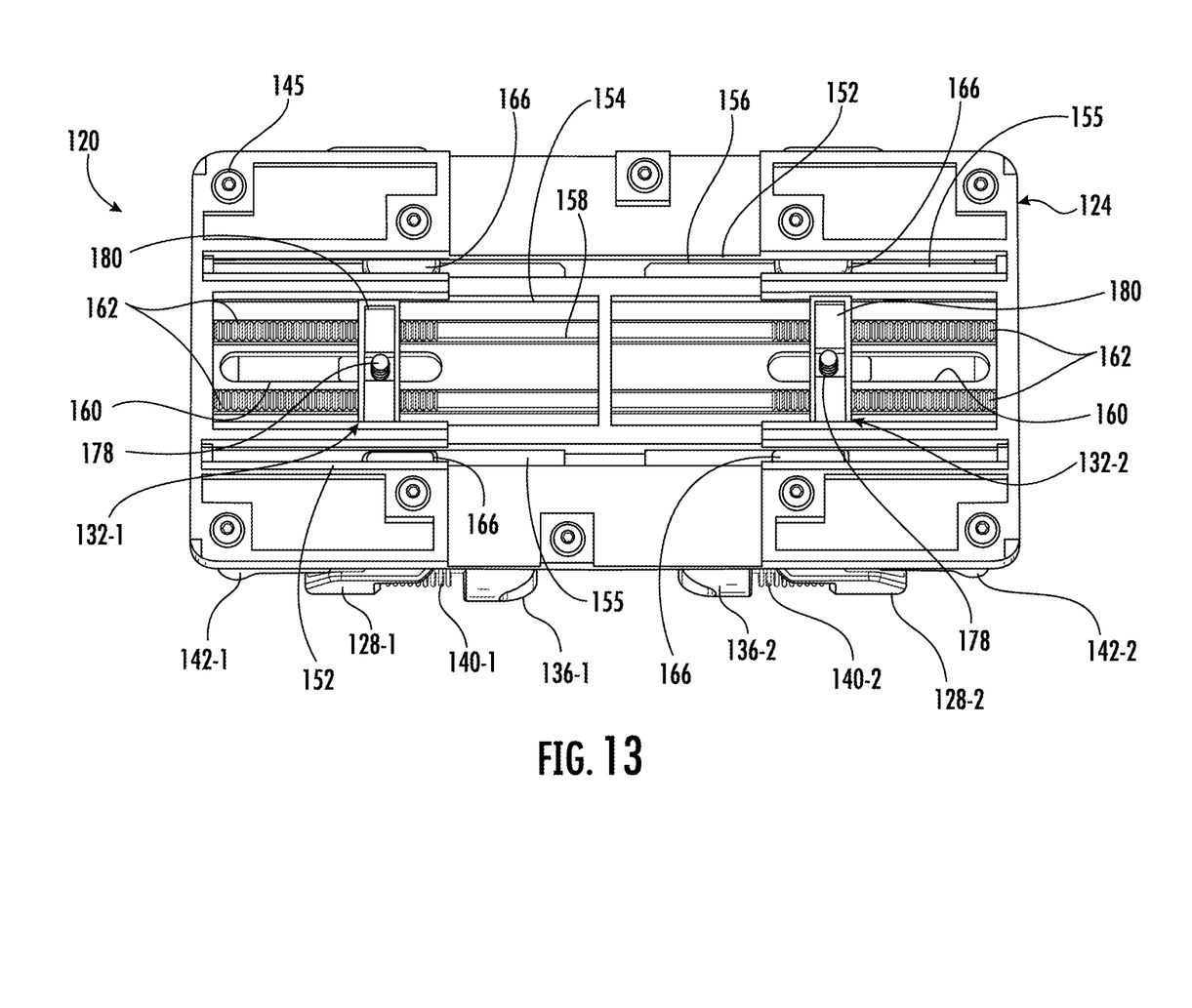
FIG. 13 is a top perspective view of the example vehicle accessory mounting system of FIG. 11.

Hooks 136-1 and 136-2 of system 120 are carried by carriages 120-1 and 128-2, respectively. Hooks 136-1 are configured to engage a first portion of a rack, such as rack 102 or 202 while hooks 136-2 are configured to engage a second portion of the rack 102 or 202. In the example illustrated, hooks 136-1 engage a first side of the rack while hooks 136-2 engage a second opposite side of the rack. Each of hooks 136-1, 136-2 includes a recess or notch 186 configured to at least partially receive a portion of the rack. FIG. 13 illustrates system 120 with hooks 136-1 engaging and partially receiving bar 208-1 while notches 186 of hooks 136-2 partially receive bar 208-2 of the rack 102, 202. Each of hooks 136-1 is supported at an end of handle 142-1 which slidably extends through handle passages 172 of carriage 128-1. Each of hooks 136-2 is supported at end of handle 142-2 which slidably extends through handle passages 172 of carriage 128-2.

Handles 142 facilitate moving of hooks 136 between extended positions for engagement of the hooks 136 with the rack 102, 202 and retracted positions for release of the hooks 136 from the rack 102, 202. Handles 142 further provide a surface or structure by which hooks 136 may be manually moved between the extended and retracted positions. Springs 140 comprise compression springs captured between hooks 136 and carriages 128. Springs 140-1 resiliently bias hooks 136-1 towards hooks 136-2 while springs 140-2 resiliently bias hooks 136-2 towards hooks 136-1. A user may pull handles 142-1 and 142-2 in opposite directions against the bias of springs 140 to spread apart hooks 136 to permit system 120 to be separated from the previously attached rack or to facilitate positioning of the rack 102, 202 between the spread apart hooks 136. Once the rack 102, 202 has been positioned between the spread apart hooks 136, handles 142 may be released, permitting springs 140 to urge hooks 136-1, 136-2 towards one another and into engagement with rack 102, 202.

Although carriages 128-1 are each illustrated as movably supporting a pair of hooks 136-1 resiliently biased by a pair of springs 140-1, in other implementations, carriage 128-1 may support a single hook 136-1, such as a single elongate hook spanning between the ends of handle 142-1, wherein the single elongate hook may be biased by single spring or multiple springs. Likewise, carriage 128-2 may support a single hook 136-2, such as a single elongate hook spanning between the ends of handle 142-2, wherein the single elongate hook may be biased by single spring or multiple springs.

Figure 11:
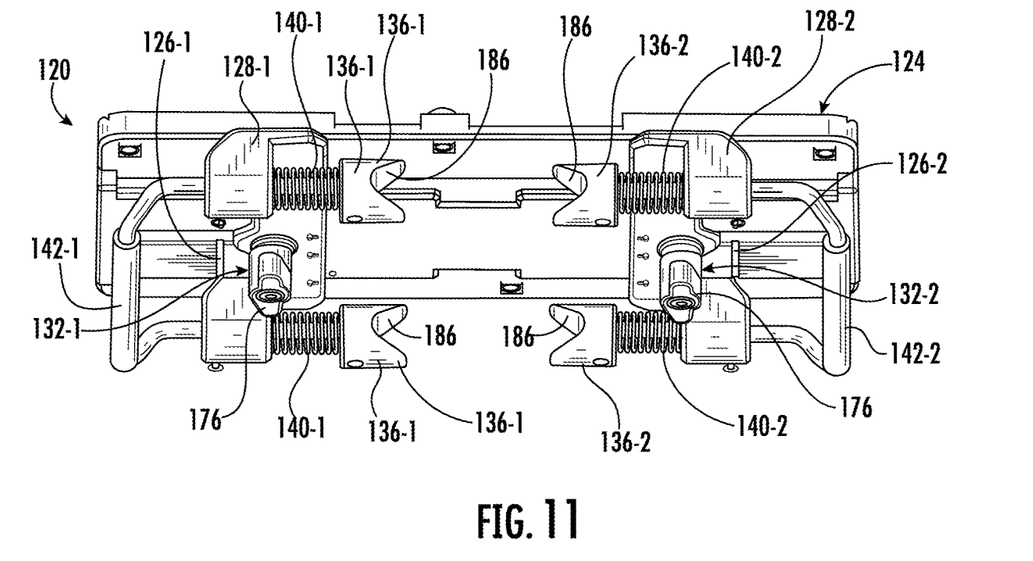
FIG. 11 is a bottom perspective view of the example vehicle accessory mounting system of FIG. 7, illustrating example carriages repositioned relative to an example accessory base.
Figure 12:
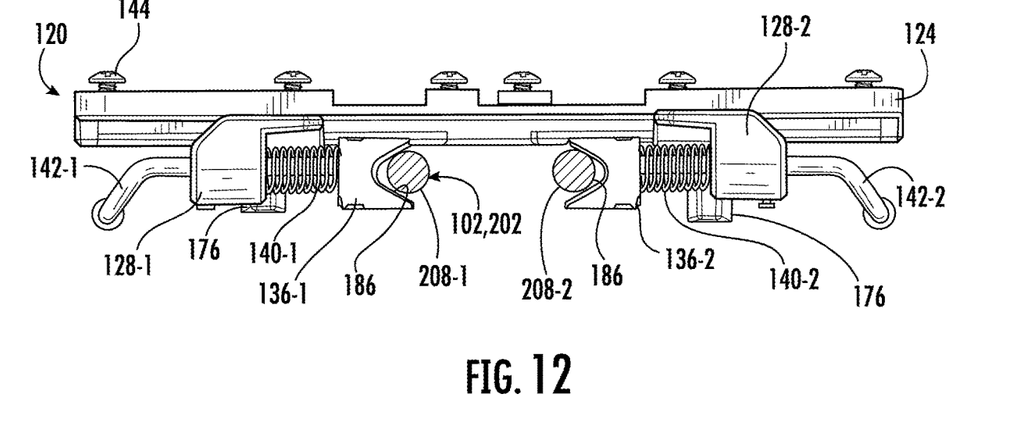
FIG. 12 is a side view of the example vehicle accessory mounting system of FIG. 11.

FIGS. 11-13 illustrate system 120 with carriages 128-1 and 128-2 moved from first available position relative to accessory base 124 shown in FIGS. 6, 7, 9 and 10, accommodating a wider rack 102, 202, to a second available position relative to accessory base 124, accommodating a narrower rack 102, 202. As shown by FIG. 13, at the second position, retainers 132 releasably retain and lock carriages 128-1, 120-2 at the new closer positions. As shown by FIG. 12, at the first position, hooks 136 are resiliently biased into engagement with opposite sides of rack 102, 202. Likewise, handles 142-1, 142-2 may be pulled or spread apart, against the bias of springs 140-1 and 140-2 to release system 120 from the rack 102, 202 for demounting system 120 from the rack 102, 202. System 120 may be disconnected from the rack 102, 202 and may be later remounted to the same rack 102, 202. In such circumstances, retainers 132 maintain the selected locations for carriages 128 and maintain the customized configuration of system 120 for the particular rack. At the same time, release of retainers 132 may be performed to adjust the positioning of carriages 128 to accommodate a differently sized rack.

Figure 14:
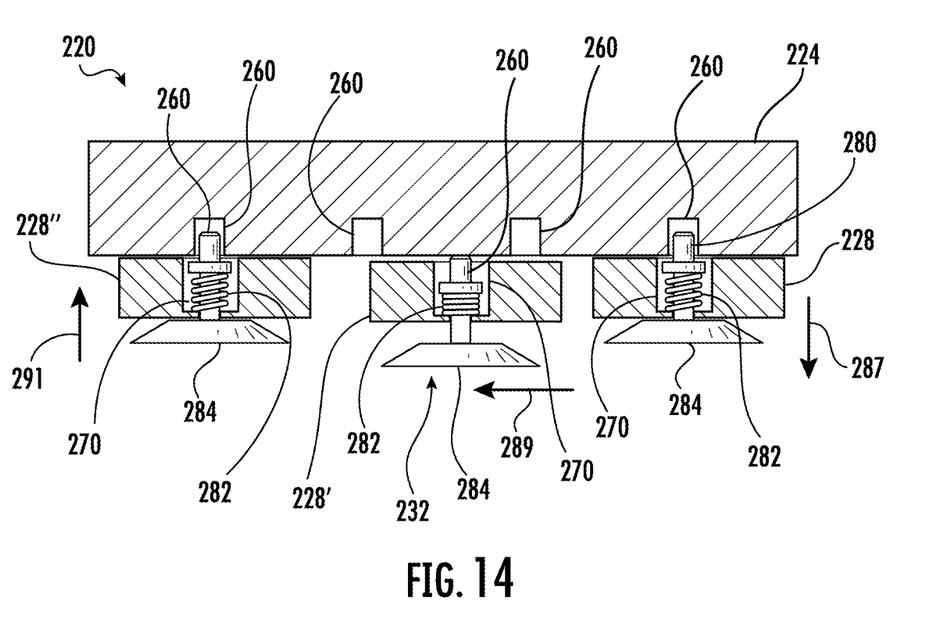
FIG. 14 is a sectional view of an example vehicle accessory mounting system, illustrating repositioning of an example carriage relative to an example accessory base by an alternative example retainer.

In some implementations, other mechanisms may be utilized to releasably retain or lock each of carriages 128 at desired positions relative to accessory base 124. FIG. 14 schematically illustrates portions of an example vehicle rack mounting system 220. System 220 is similar to system 120 except that system 220 comprises accessory base 224, carriages 228, and retainers 232. Accessory base 224 is similar to accessory base 124 except that accessory base 224 replaces middle track 154 with a series of the detents 260 generally extending along where slot 160 extends.

Carriages 228 (one of which is shown) are similar to carriages 128 except that carriages 228 replace retainer passage 170 with retainer cavity 270. Those remaining components or portions of carriages 228 are shown or described above in more detail with respect to carriages 128 in FIGS. 6-9. Although not shown in FIG. 11, each of carriages 228 comprises handle passages 172 for slidably receiving handles 142.

Like retainers 132, retainers 232 (one of which is shown) releasably retainer secure the associated carriage 228 at a selected one of a plurality of available positions relative to accessory base 224. Each retainer 232 comprises a pin 280 that is slidably guided towards and away from the detents 260 and which is resiliently biased by a compression spring 282 towards the detents 260. The compression spring 282 may urge the pin 280 into one of the detents 260 at a selected position when the pin 280 is sufficiently aligned with a particular one of the detents 260, securing the retainer 232 and the associated carriage 228 in place along the accessory base 224. The pin 280 may be attached to a knob 284 or other handle projecting on a bottom side of the carriage 228, permitting the pin 280 to be pulled (in the direction indicated by arrow 287) against the bias of the spring 282 and out of the detent 260 such that the carriage 228 may be slid along accessory base 224 (as indicated by arrow 289) to a new position. Upon reaching the new position, wherein the pin 280 is aligned with a new one of the series of detents 260, the knob or handle 284 may be released, permitting the spring 282 to once again urge the pin 280 into the new detent 260 (as indicated by arrow 291) to secure the associated carriage 228 at the new selected position.

Although retainer 232 is illustrated as having a projection in the form of a pin and a detent in the form of a depression or hole, in other implementations, the detents may comprise a series of notches or a length of teeth in the accessory base, wherein the projection carried by the carriage may comprise a member configured to project into a selected one of the notches or a member having teeth to mate with the teeth of the accessory base, wherein the member is movable along an axis perpendicular to the plane of the accessory base between the detent engaging/carriage locking position and the detent withdrawn position, and wherein the spring 282 resiliently biases the member towards the detent engaging position.

In yet other implementations, the detents may comprise holes, notches, teeth or the like formed in the bottom side of the accessory base, wherein the carriage carries a lever having a projection (pin, hook, catch etc.) that pivots about a fulcrum between a detent engaging/carriage locking position and a detent withdrawn position that allows the carriage to slide or move relative to the accessory base. Such pivoting may be about an axis that is parallel to the plane of the accessory base. In such implementations, the projection may be resiliently biased toward the detent engaging position by a spring, such as a leaf spring, a torsion spring or a compression spring.

Although the present disclosure has been described with reference to example implementations, workers skilled in the art will recognize that changes may be made in form and detail without departing from the disclosure. For example, although different example implementations may have been described as including features providing various benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A vehicle accessory mounting system comprising:
   an accessory base;
   a carriage movably coupled to the accessory base for movement along an axis relative to the accessory base;
   a retainer configured to releasably retain the carriage at one of a plurality of available positions along the accessory base;
   a first hook carried by the carriage, the first hook being linearly movable along the axis relative to the carriage between an extended position for engagement of the first hook with a first portion of a rack and a retracted position for release of the first hook from the first portion of the rack;
   a spring captured between the first hook and the first carriage to resiliently bias the first hook along the axis towards the extended position; and
   a second hook coupled to the base and facing the first hook, the second hook being configured to engage a second portion of the rack.

2. The vehicle accessory mounting system of claim 1, further comprising a handle coupled to the first hook and configured to move the first hook from the extended position towards the retracted position against a bias of the spring.

3. The vehicle accessory mounting system of claim 2, wherein the carriage comprises a passage, wherein the handle slidably extends through the passage.

4. The vehicle accessory mounting system of claim 1, wherein the accessory base is configured to be releasably mounted to an accessory.

5. The vehicle accessory mounting system of claim 1 further comprising an accessory including the accessory base.

6. The vehicle accessory mounting system of claim 1 further comprising a plurality of indicia at predefined spacings along a face of the accessory base, the predefined spacings corresponding to different rack widths.

7. The vehicle accessory mounting system of claim 1 further comprising:
   a second carriage movably coupled to the base;
   a second retainer configured to releasably retain the second carriage at one of a plurality of available positions along the accessory base,
   wherein the second hook is carried by the second carriage, wherein the second hook is movable relative to the second carriage between a second hook extended position for engagement of the second hook with the second portion of a bike rack and a second hook retracted position for release of the second hook from the second portion of the rack; and
   a second spring captured between the second hook and the second carriage to resiliently bias the second hook towards the second hook extended position.

8. The vehicle accessory mounting system of claim 7, further comprising:
   a first handle coupled to the first hook and configured to move the first hook from the extended position towards the retracted position against a bias of the spring; and a second handle coupled to the second hook and configured to move the second hook from the second hook extended position towards the second hook retracted position against a bias of the second spring.

9. The vehicle accessory mounting system of claim 8, wherein the carriage comprises a passage, wherein the handle slidably extends through the passage, wherein the second carriage comprises a second passage, wherein the second handle slidably extends through the second passage.

10. The vehicle accessory mounting system of claim 7, wherein the carriage moves along a first face of the accessory base, and wherein the retainer comprises:
a retainer clamp on a second face of the accessory base; and
a first retainer knob carried by the carriage and extending through the accessory base into connection with the retainer clamp, the first retainer knob being manually manipulatable to move the retainer clamp between a carriage locking state in which the retainer clamp engages the accessory base to inhibit movement of the carriage relative the accessory base and a carriage releasing state in which the retainer clamp is sufficiently disengaged from the accessory base to facilitate movement of the carriage relative to the base,
wherein the second carriage moves along the first face of the accessory base and wherein the second retainer comprises:
a second retainer clamp on a second face of the accessory base;
a second retainer knob carried by the second carriage and extending through the accessory base into connection with the second retainer clamp, the second retainer knob being manually manipulatable to move the second retainer clamp between a second retainer clamp carriage locking state in which the second retainer clamp engages the accessory base to inhibit movement of the second carriage relative the accessory base and a second retainer clamp carriage releasing state in which the second retainer clamp is sufficiently disengaged from the accessory base to facilitate movement of the second carriage relative to the accessory base.

11. The vehicle accessory mounting system of claim 10, wherein the second face of the accessory base comprises one of a first detent and a first projection, wherein the retainer clamp comprises the other of the first detent and the first projection, wherein the first projection is received within the first detent when the retainer clamp is in the carriage locking state and is withdrawn from the first detent when the retainer clamp is in the carriage releasing state,
wherein the second face of the accessory base comprises one of a second detent and a second projection, wherein the second retainer clamp comprises the other of the second detent and the second projection, wherein the second projection is received within the second detent when the second retainer clamp is in the second retainer clamp carriage locking state and is withdrawn from the second detent when the second retainer clamp is in the second retainer clamp carriage releasing state.

12. The vehicle accessory mounting system of claim 11, wherein the retainer knob comprises a screw shaft extending through the accessory base and in threaded engagement with the retainer clamp such that rotation of the first retainer knob translates the retainer clamp between the carriage locking state and the carriage releasing state, and
wherein the second retainer knob comprises a second screw shaft extending through the accessory base and in threaded engagement with the second retainer clamp such that rotation of the second retainer knob translates the second retainer clamp between the carriage locking state and the carriage releasing state of the second retainer knob.

13. The vehicle accessory mounting system of claim 7 further comprising:
a first plurality of indicia at predefined spacings along the first face of the accessory base, the predefined spacings corresponding to different bike rack widths; and
a second plurality of indicia at predefined spacings along the first face of the accessory base, the predefined spacings corresponding to different rack widths.

14. The vehicle accessory mounting system of claim 1 further comprising an accessory configured to be releasably mounted to the accessory base, wherein the accessory comprises a basket.

15. A vehicle accessory mounting system comprising:
an accessory base;
a carriage movably coupled to the accessory base;
a retainer configured to releasably retain the carriage at one of a plurality of available positions along the accessory base;
a first hook carried by the carriage, the first hook being movable relative to the carriage between an extended position for engagement of the first hook with a first portion of a rack and a retracted position for release of the first hook from the first portion of the rack;
a spring captured between the first hook and the first carriage to resiliently bias the first hook towards the extended position; and
a second hook coupled to the base and facing the first hook, the second hook being configured to engage a second portion of the rack, wherein the carriage moves along a first face of the accessory base and wherein the retainer comprises:
a retainer clamp on a second face of the accessory base; and
a retainer knob carried by the carriage and extending through the accessory base into connection with the retainer clamp, the retainer knob being manually manipulatable to move the retainer clamp between a carriage locking state in which the retainer clamp engages the accessory base to inhibit movement of the carriage relative the accessory base and a carriage releasing state in which the retainer clamp is sufficiently disengaged from the accessory base to facilitate movement of the carriage relative to the base.

16. The vehicle accessory mounting system of claim 15, wherein the second face of the accessory base comprises one of a detent and a projection, wherein the retainer clamp comprises the other of the detent and the projection, wherein the projection is received within the detent when the retainer clamp is in the carriage locking state and is withdrawn from the detent when the retainer clamp is in the carriage releasing state.

17. The vehicle accessory mounting system of claim 16, wherein the retainer knob comprises a screw shaft extending through the accessory base and in threaded engagement with the retainer clamp such that rotation of the retainer knob translates the retainer clamp between the carriage locking state and the carriage releasing state.

18. The vehicle accessory mounting system of claim 15, wherein the retainer knob comprises a screw shaft extending through the accessory base and in threaded engagement with the retainer clamp such that rotation of the retainer knob translates the retainer clamp between the carriage locking state and the carriage releasing state.

19. A vehicle accessory mounting system comprising:
an accessory base;
a carriage movably coupled to the accessory base;

a retainer configured to releasably retain the carriage at one of a plurality of available positions along the accessory base;

a first hook carried by the carriage, the first hook being movable relative to the carriage between an extended position for engagement of the first hook with a first portion of a rack and a retracted position for release of the first hook from the first portion of the rack;

a spring captured between the first hook and the first carriage to resiliently bias the first hook towards the extended position; and a second hook coupled to the base and facing the first hook, the second hook being configured to engage a second portion of the rack, wherein the retainer comprises:

a series of spaced detents in the accessory base;

a projection movably supported by the carriage between a detent engaging position and a withdrawn position, wherein the projection is resiliently biased towards the detent engaging position.

20. The vehicle accessory mounting system of claim 19, wherein the accessory base extends in a plane and wherein the projection slides along an axis perpendicular to the plane.

* * * * *